(12) United States Patent
Hsia et al.

(10) Patent No.: US 6,904,166 B2
(45) Date of Patent: Jun. 7, 2005

(54) COLOR INTERPOLATION PROCESSOR AND THE COLOR INTERPOLATION CALCULATION METHOD THEREOF

(75) Inventors: Shih-Chang Hsia, Changhua Hsien (TW); Po-Shien Tsai, Tainan (TW); Kun-Chou Chen, Taipei (TW); Ying-Jieh Huang, Taipei (TW); Hong-Hung Hsu, Kaohsiung (TW)

(73) Assignee: Avermedia Technologies, Inc. (TW)

( * ) Notice: Subject to any disclaimer, the term of this patent is extended or adjusted under 35 U.S.C. 154(b) by 739 days.

(21) Appl. No.: 09/988,255

(22) Filed: Nov. 19, 2001

(65) Prior Publication Data
US 2003/0095703 A1 May 22, 2003

(51) Int. Cl.[7] .................................................. G06K 9/00
(52) U.S. Cl. ..................... 382/162; 382/300; 358/222.1
(58) Field of Search ................................. 382/162, 167, 382/266, 300; 358/525; 348/222.1, 266, 272, 273, 280

(56) References Cited

U.S. PATENT DOCUMENTS 5,652,621 A * 7/1997 Adams et al. ............... 348/272
6,421,084 B1 * 7/2002 Chang et al. ................ 348/273
6,628,330 B1 * 9/2003 Lin ............................ 382/266
6,781,626 B1 * 8/2004 Wang ........................ 348/222.1

* cited by examiner

Primary Examiner—Phuoc Tran (57) ABSTRACT

A color interpolation processor and the color interpolation calculation method thereof are disclosed. More particularly, they relates to a color interpolation processor and the color interpolation calculation method thereof that are implemented in a real-time image process system using charge couple devices (CCD) for sampling. The color interpolation calculation method of the present invention is to perform a computation of color interpolation by utilizing the edge directions weighting and local gain approach according to the luminance density determined by the green (G) component. Therefore, the quality of interpolation is improved. Meanwhile, because the computation technique of the present invention is not complicated, the cost is lower when the color interpolation calculation method of the present invention is implemented in image signal process system. Thus, the production cost is decreased tremendously.

27 Claims, 8 Drawing Sheets

FIG. 1

|  |  |  |  |  |  |  |  |  |
|---|---|---|---|---|---|---|---|---|
| R19 | G18 | R17 | G16 | R15 | G14 | R13 | G12 | R11 |
| G29 | B28 | G27 | B26 | G25 | B24 | G23 | B22 | G21 |
| R39 | G38 | R37 | G36 | R35 | G34 | R33 | G32 | R31 |
| G49 | B48 | G47 | B46 | G45 | B44 | G43 | B42 | G41 |

FIG. 2

| R1N | ....... | R15 | G14 | R13 | G12 | R11 |
| G2N | ....... | G25 | B24 | G23 | B22 | G21 |
| ⋮ |  |  |  |  |  |  |
| RMN | ....... | RM5 | GM4 | RM3 | GM2 | RM1 |

COLOR INTERPOLATION PROCESSOR AND THE COLOR INTERPOLATION CALCULATION METHOD THEREOF

FIELD OF THE INVENTION

The present invention relates to a color interpolation processor and the color interpolation calculation method thereof. More particularly, it relates to a color interpolation processor and the color interpolation calculation method thereof that are implemented in a real-time image process system using charge couple devices (CCD) for sampling. Therefore the efficiency of color interpolation process will be enhanced, and the cost and the process time of color interpolation will be reduced also.

BACKGROUND OF THE INVENTION

Presently, the CCD sensor is usually used for sampling in most of digital camera system. An incident light will be transformed to an electronic signal by utilizing the CCD according to the photoelectric effect. Then, the electronic signal will be converted and digitized for an image process and recorded by an analog/digital converter. Moreover, the sampling format usually is a color filter array (CFA) format in order to reduce the size of sensor.

In digital sampling system using CCD as a sampling unit, there are three departments. The first department is involved in the image process in the CCD sampling system, such as optical black alignment compensation, defect prevention, white balance and auto-white balance, and the separation and interpolation of color signal of CFA. From these image processes, a colorful image signal corresponding to every picture pixel is obtained, and then, a correction and compensation process follows, such as lens flicker compensation, hue correction, gamma correction, border correction and brightness adjustment, etc.

Red (R), Green (G) and Blue (B) are three primary colors for images. When the CFA sampling format is used, only one color component of R, G, and B is taken at every sampling point. In order to make up the missing components for forming a complete color structure at every sampling point, a complicated calculation has to be performed to obtain two deficient colors by interpolation at every sampling point thereby enhancing the resolution of sampling image.

The so-called interpolation is to calculate and determine the unknown pixel among several known sampling points. There are lots of traditional computation methods for interpolation existing, such as nearest neighbor interpolation, bilinear interpolation, cubic B-spline interpolation and cubic convolution interpolation, etc. However, these traditional interpolation methods have their own defects respectively. For example, the calculating speeds of the nearest neighbor interpolation and bilinear interpolation are fast but lacking of good interpolation quality. A good image quality cannot be obtained because a blurred image always exists after the interpolation is done, so that the nearest neighbor interpolation and the bilinear interpolation are not suitable for use in the high resolution, high contrast image process system.

As to the cubic B-spline interpolation and the cubic convolution interpolation, they require many parameters for the interpolating calculation, so that their calculating processes are very complicated. By utilizing the cubic B-spline interpolation and the cubic convolution interpolation, a good and accurate interpolation value can be obtained but their complicated calculations take a lot of time. Therefore, the cubic B-spline interpolation and the cubic convolution interpolation are not suitable for implementing in a real-time digital color sampling system. Moreover, in the digital color sampling system with CCD and CFA sampling format, colorful stains and blurred borders always appear in the image after the interpolation is done by the traditional interpolation methods.

In order to enhance the image quality after interpolation, there are many methods provided, such as the discriminated color correlation approach and the enlarged neighborhood approach. However, the computational structures of these interpolation methods are too complicated. For example, many buffers are needed to record the parameters during the computation and numerous additions are required during the interpolation computation of two deficient colors in a sampling point. Therefore, the system source will be quickly consumed. If the aforementioned interpolation methods are implemented, the cost will increase greatly. Moreover, if the aforementioned interpolation methods are implemented in the real-time image process system, due to the long computing time for interpolation, the efficiency of the image process system will be decreased.

SUMMARY OF THE INVENTION

In the view of the background of the invention described above, in the traditional image process system with sampling by CCD and CFA format, especially for the real-time image process system, the traditional computation methods of interpolation, such as nearest neighbor interpolation, bilinear interpolation, cubic B-spline interpolation and cubic convolution interpolation, etc., fail to provide good quality and rapid calculation. Therefore, the product that utilizes the traditional computation methods of interpolation lacks of both good quality and rapid calculation of interpolation.

It is the principal object of the present invention to provide a color interpolation processor and the color interpolation calculation method thereof, and more particularly, relating to the implementation in a real-time image process system using charge couple devices (CCD) for sampling. Because the computation technique of the present invention is not complicated, the cost is lower for implementing the color interpolation calculation method of the present invention in an image signal process system. Thus, the production cost will be decreased tremendously.

In accordance with the aforementioned purpose of the present invention, the present invention provides a color interpolation processor and the color interpolation calculation method thereof, and more particularly relating to the implementation in a real-time image process system using charge couple devices (CCD) for sampling. Because the luminance density that is determined by the green (G) component, the edge directions weighting and local gain approach are utilized mainly to perform the computation of G interpolation, thereby enhancing the image definition after interpolation. Moreover, since the computation technique of the present invention is not complicated, the computation of interpolation is fast, so that the present invention is suitable for being implemented in the real-time image process system, and further, only two buffers are required to record the data while in application, so that the cost is decreased effectively.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In CFA pattern, only one color component is sampled in each cycle, so that one color component of R, G and B is taken at every sampling point. In order to reconstruct complete RGB components from CFA format, two colors components have to be computed by interpolation at every sampling point. Generally, the image resolution is mostly determined by image luminance density. Luminance density could be defined by RGB components as equation (1).

$$Y = 0.59G + 0.11B + 0.3R \quad (1)$$

From the equation (1), it is shown that G component has the maximum weighting value for determining the luminance level, so that the interpolation of G component is more important than those of R and B.

Figure 1:
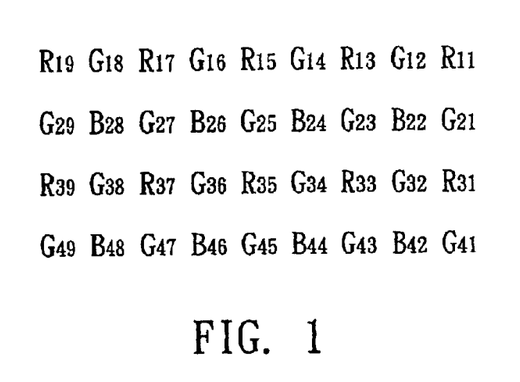
FIG. 1 is an image data array of a preferred embodiment of the present invention which is sampled by CFA.

Referring to FIG. 1, which shows that an image data array of a preferred embodiment of the present invention, which is sampled by CFA. The image data array of FIG. 1 is constructed from the image data of four rows and nine columns. The image data of the first row and the third row are constructed from R sampling data and G sampling data spaced in-between. The image data of the second row and the fourth row are constructed from G sampling data and B sampling data spaced in-between. First, the $G_{24}$ interpolation is considered at the $B_{24}$ position (as shown in FIG. 1, the intersection of the second row and the forth column of the image data array) for the introduction of the computation of interpolating a G component because the interpolation of G component is more important than those of R and B.

To achieve high performance, the edge information is adopted to enhance the interpolated resolution. First, as the equation (2) and the equation (3) shown below, the local vertical differential and the local horizontal differential are computed.

$$\Delta V_4 = |G_{14} - G_{34}| \quad (2)$$

$$\Delta H_5 = |G_{23} - G_{25}| \quad (3)$$

The local vertical differential is the absolute value of $G_{34}$ sampling data minus $G_{14}$ sampling data. The local horizontal differential is the absolute value of $G_{25}$ sampling data minus $G_{23}$ sampling data.

Then, the G interpolation is computed by two steps. In the first step, weighting distribution is employed according to edge direction differential with the equation (2) and the equation (3). The G initial interpolation $$(\hat{G}_{24}^{(1)})$$

of $B_{24}$ is computed as shown in the equation (4).

$$\begin{cases} \text{if} \quad \Delta H = 0 \text{ and } \Delta V = 0 \text{ then} \\ \quad \hat{G}_{24}^{(1)} = \dfrac{AH + AV}{2} \\ \text{else} \quad \hat{G}_{24}^{(1)} = AH \times \dfrac{\Delta V}{\Delta H + \Delta V} + AV \times \dfrac{\Delta H}{\Delta H + \Delta V} \\ \quad \quad \quad = AH \times \dfrac{\Delta V}{\Delta H + \Delta V} + AV \times \left(1 - \dfrac{\Delta V}{\Delta H + \Delta V}\right) \end{cases} \quad (4)$$

wherein $\hat{G}_{24}^{(1)}$ is the G initial interpolation at $B_{24}$. $AH = (G_{25} + G_{23})/2$ and $AV = (G_{14} + G_{34})/2$ individually denotes the average interpolation from horizontal and vertical directions. From the equation (4), the interpolated value is based on $\Delta V$ and $\Delta H$. As the differential of one direction is larger, the weighting value of the direction is decreased thereby preventing image blur. In the special case, when $\Delta V = 0$ and $\Delta H = 0$, the $G_{24}$ initial interpolation is the average of AH and AV.

And then the local mean (LM) of $B_{24}$ is computed as shown in the equation (5)

$$LM(B_{24}) = \dfrac{B_{22} + \hat{B}_{23} + B_{24} + B_{26}}{4} \quad (5)$$

wherein the $\hat{B}_{23}$ is the interpolation value of $G_{23}$. The G final interpolation $$(\hat{G}_{24}^{(2)})$$

is computed as shown in the equation (6)

$$\hat{G}_{24}^{(2)} = \hat{G}_{24}^{(1)} \times \dfrac{B_{24}}{LM(B_{24})} \quad (6)$$

wherein $B_{24}/LM(B_{24})$ is the local gain of $B_{24}$.

Then the following discussion is about the computation of R interpolation value of $B_{24}$. First, the edge mean of $R_{24}$ is computed as shown in the equation (7).

$$LM(R_{24}) = \frac{R_{15} + R_{13} + R_{35} + R_{33}}{4} \quad (7)$$

And the R Interpolation ($\hat{R}_{24}$) will be computed as shown in the equation (8).

$$\hat{R}_{24} = LM(R_{24}) \times \frac{B_{24}}{LM(B_{24})} \quad (8)$$

Similarly, the G final interpolation ($\hat{G}_{33}^{(2)}$) of $R_{33}$ is computed as shown in the equation (9)

$$\hat{G}_{33}^{(2)} = \hat{G}_{33}^{(1)} \times \frac{R_{33}}{LM(R_{33})} \quad (9)$$

wherein the $\hat{G}_{33}^{(1)}$ is the G initial interpolation of $R_{33}$ and $R_{33}/LM(R_{33})$ is the local mean of $R_{33}$. The local mean of $R_{33}$ ($LM(R_{33})$) is computed as shown in the equation (10)

$$LM(R_{33}) = \frac{R_{31} + \hat{R}_{32} + R_{33} + R_{35}}{4} \quad (10)$$

wherein $\hat{R}_{32}$ is the interpolation of $G_{32}$ in FIG. 1.

As to the computation of the B interpolation of $R_{33}$, the edge mean of $B_{33}$ is computed as shown in the equation (11) first.

$$LM(B_{33}) = \frac{B_{22} + B_{24} + B_{42} + B_{44}}{4} \quad (11)$$

Then, the B interpolation ($\hat{B}_{33}$) is computed as shown in the equation (12)

$$\hat{B}_{33} = LM(B_{33}) \times \frac{R_{33}}{LM(R_{33})} \quad (12)$$

wherein $LM(R_{33})$ is computed as shown in the equation (10).

To compute the B interpolation and the R interpolation of $G_{23}$, the mean value of $G_{23}$ is computed as shown in the equation (13) first.

$$LM(G_{23}) = \frac{G_{12} + G_{14} + G_{34} + G_{32}}{4} \quad (13)$$

And then the R interpolation ($\hat{R}_{23}$) is computed as shown in the equation (14).

$$\hat{R}_{23} = \frac{R_{13} + R_{33}}{2} \times \frac{G_{23}}{LM(G_{23})} \quad (14)$$

The B interpolation ($\hat{B}_{23}$) of $G_{23}$ is computed as shown in the equation (15)

$$\hat{B}_{23} = \frac{B_{22} + B_{24}}{2} \times \frac{G_{23}}{LM(G_{23})} \quad (15)$$

After the aforementioned descriptive example, the B interpolation and the R interpolation from the G sampling data, the G interpolation and the R interpolation from the B sampling data and the G interpolation and the B interpolation from the R sampling data are discussed. Therefore, the color interpolation calculation method of the present invention can be implemented in the image data array of FIG. 1 for the relational color interpolation for every sampling point.

Figure 2:
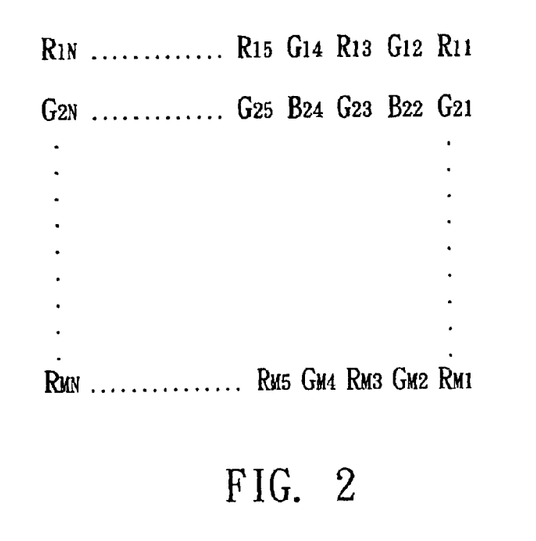
FIG. 2 is an image data array of another preferred embodiment of the present invention which is sampled by CFA.

Referring to FIG. 2, which shows an image data array of another preferred embodiment of the present invention, which is sampled by CFA. The image data array of FIG. 2 is constructed from the image data of M rows and N columns, wherein M is an integer that is not smaller than 3 and N is an integer that is not smaller than 6. The color interpolation calculation method of the present invention can be implemented in the image data array constructed from a plurality of rows and a plurality of columns for interpolation computation, and is not limited to the image data array of FIG. 1.

Figure 3:
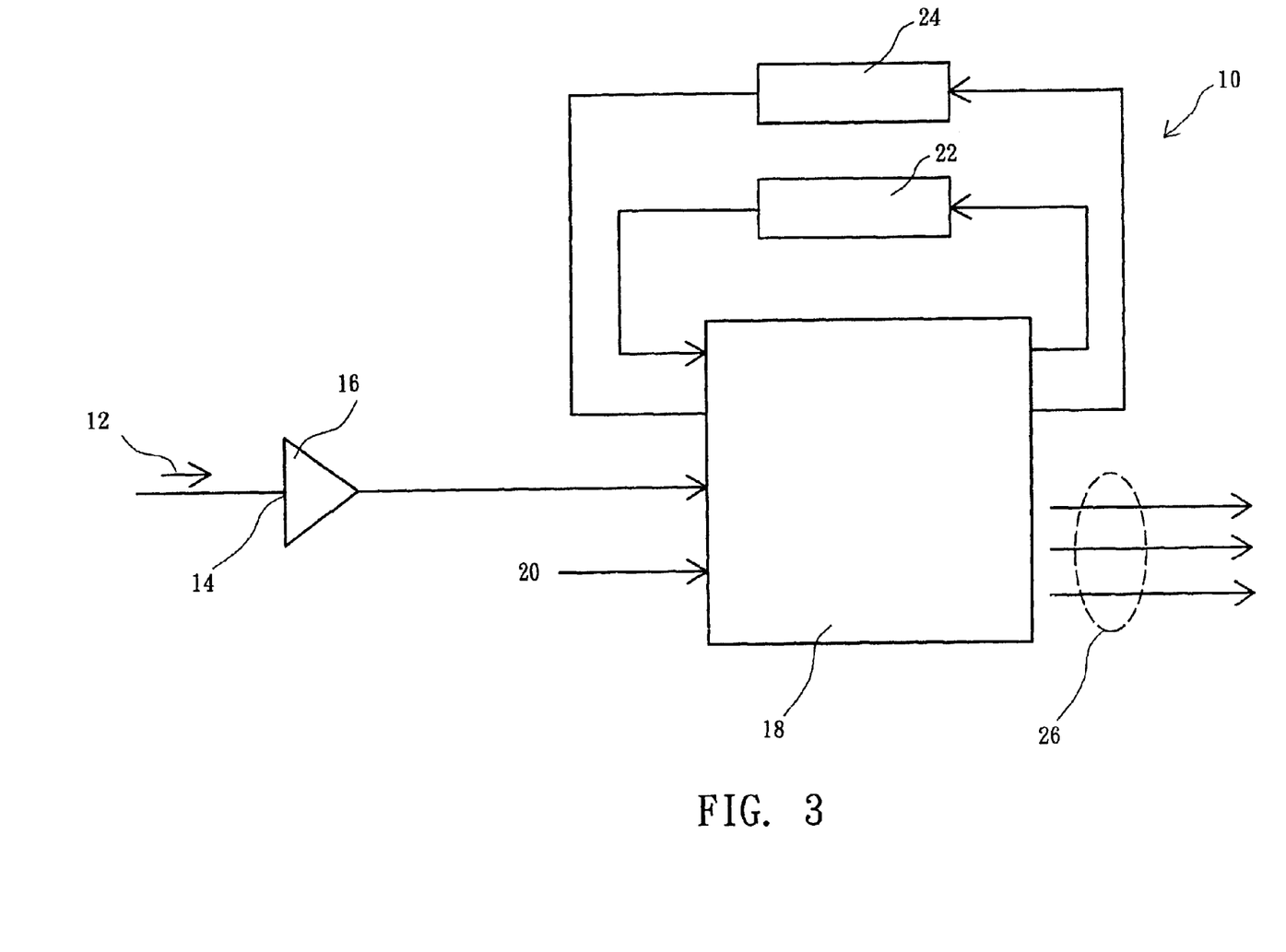
FIG. 3 is a real-time color interpolation process system of a preferred embodiment of the present invention.

Referring to FIG. 3, which shows a real-time color interpolation process system of a preferred embodiment of the present invention. In the real-time color interpolation process system 10, the image signal 12 from CCD is entered into an analog/digital converter (ADC) 16 for analog/digital conversion from an input terminal 14, and then the sampling data formed by rows is outputted to a color interpolation processor 18. Meanwhile, the vertical and horizontal synchronous signals are entered into the color interpolation processor 18 for controlling the operation thereof. When the sampling data of the first row is inputted to the color interpolation processor 18, the color interpolation processor 18 does not operate, and the sampling data of the first row are saved into a buffer 22. Then, the sampling data of the second row are inputted to the color interpolation processor 18, and the color interpolation processor 18 does not operate either, and the sampling data of the second row are saved into a buffer 24. After the sampling data of the third row are inputted to the color interpolation processor 18, and the sampling data of the first row and the sampling data of the second row are inputted to the color interpolation processor 18 from the buffer 22 and the buffer 24 at the same time, then the computation begins. When the correlative color interpolations are obtained, the R, G and B components are outputted from the output terminal 26.

In other words, when the sampling data of i row and i+1 row are inputted to the color interpolation processor 18, the sampling data of i row and i+1 row are saved into the buffer 22 and the buffer 24. After the sampling data of the i+2 row are inputted to the color interpolation processor 18, the color interpolation processor begins to operate. Therefore, only two buffers are utilized for real-time color interpolation computation in the color interpolation calculation method of the present invention, thereby obtaining the R, G and B components. Thus, the cost and the difficulty of implementation are decreased.

Figure 4:
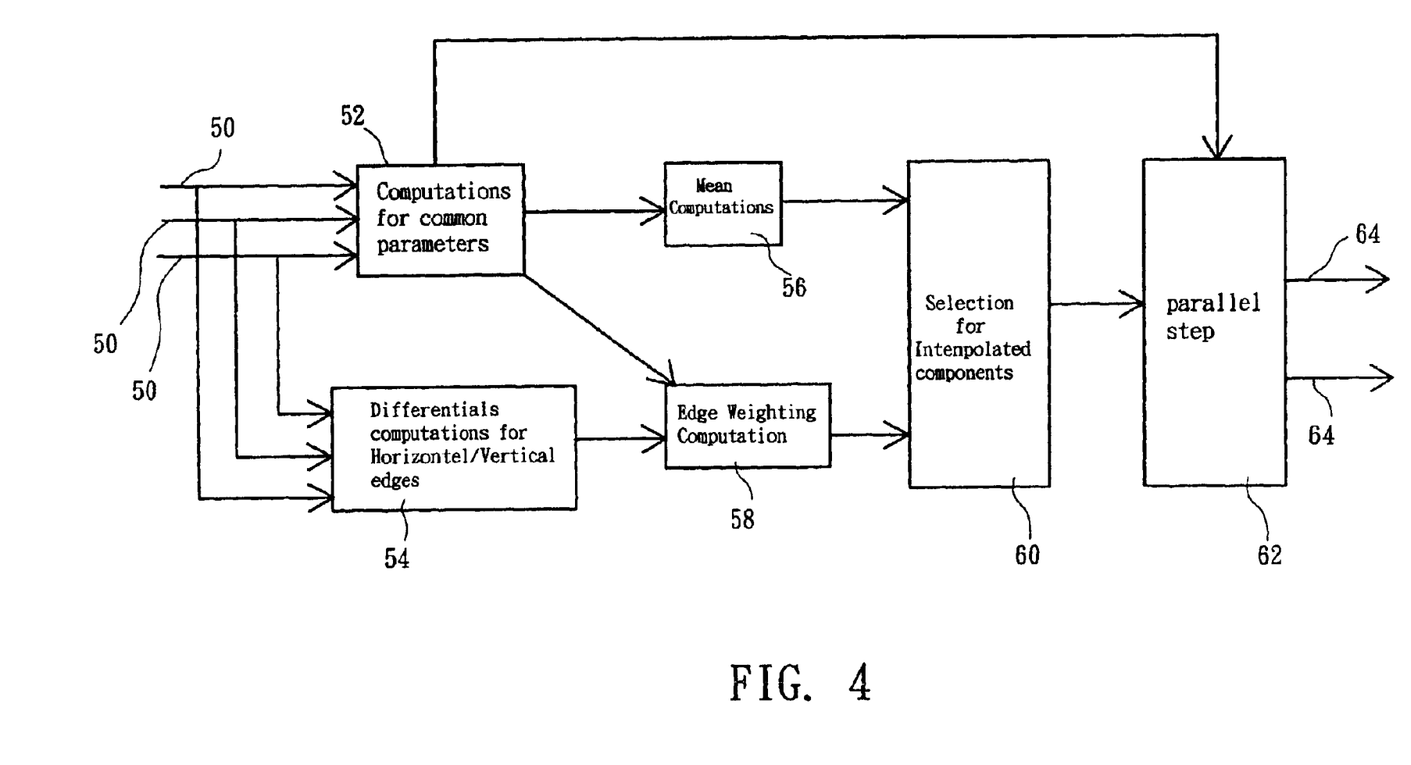
FIG. 4 is an internal operational flow sheet of the color interpolation processor of a preferred embodiment of the present invention according to FIG. 3.

Referring to FIG. 4, which shows an internal operational flow sheet of the color interpolation processor of a preferred embodiment of the present invention according to FIG. 3. First, the sampling data of i row, the sampling data of i+1 row and sampling data of i+2 row enter the color interpolation processor 18 from an input terminal 50 and the computations for common parameter 52 and the differential computations for horizontal/vertical edges 54 are performed. Then the mean computations 56 are performed with the result from the computations for common parameter 52 for the local mean and the edge mean of the correlative color. For the G final interpolation, the edge weighting computation 58 is performed with the results from the computations for common parameter 52 and the differential computations for horizontal/vertical edges 54. After the G final interpolation is done, the edge mean and the local mean of the correlative color are obtained, and then the selection for interpolated components 60 is performed to generate an appropriate output signal. Then, a parallel step 62 is performed with the appropriate output signal and the result of computations for common parameter 52, thereby outputting a correlative interpolation from output 64.

Figure 5:
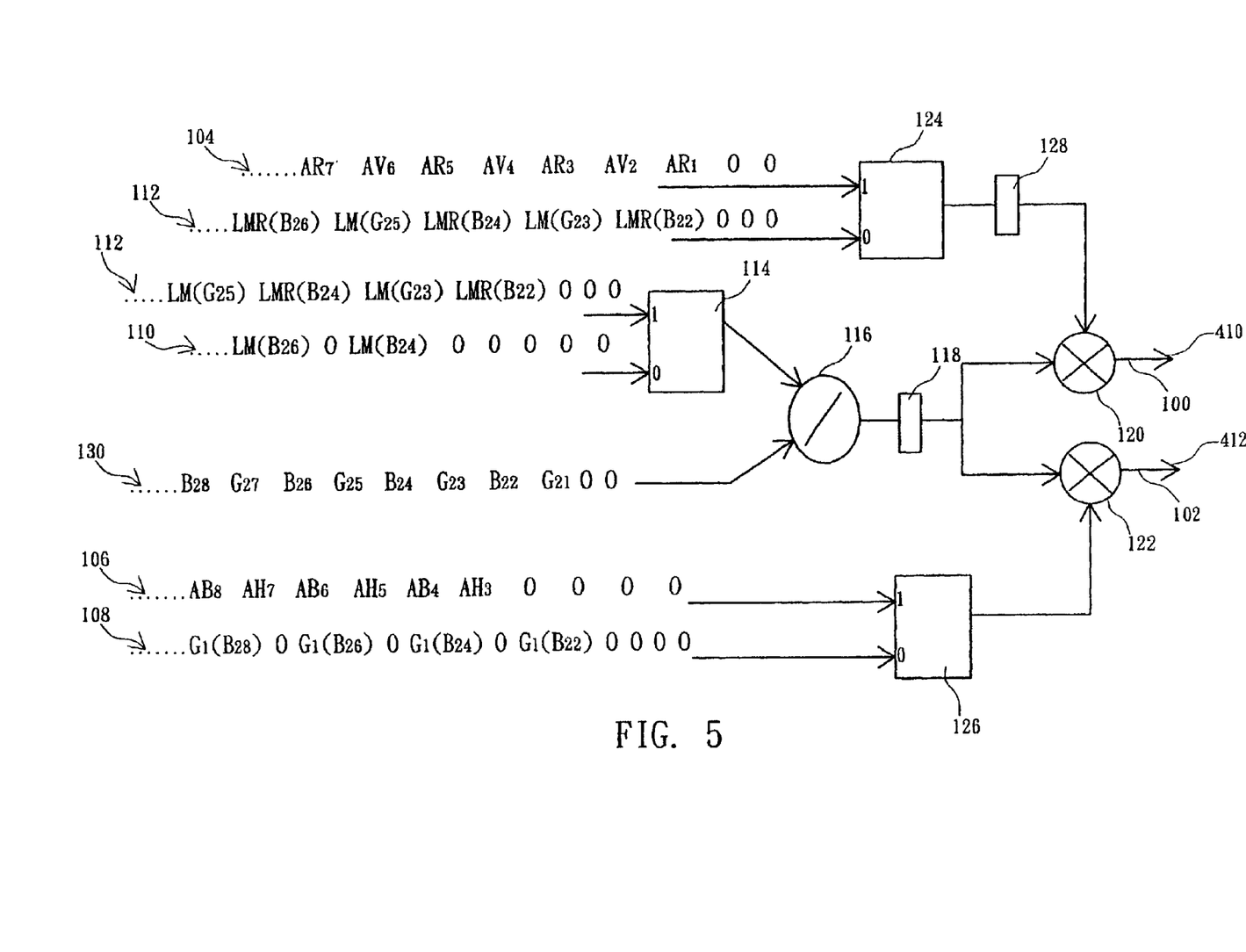
FIG. 5 is a core operational flow sheet of a preferred embodiment of the present invention according to the image data array shown in FIG. 1 and the internal operational flow sheet shown in FIG. 4.

Referring to FIG. 5, which shows a core operational flow sheet of a preferred embodiment of the present invention according to the image data array of FIG. 1 and the internal operational flow sheet of FIG. 4. The illustration of the core operational flow sheet of FIG. 5 is based on the interpolation computation of the sampling data of the second row (the i+1 row also) of the image data array of FIG. 1. For example, the signal stream 412 is outputted from the output terminal 102 of FIG. 5. The signal stream 412 is constructed with the correlative G final interpolation and B interpolation of the sampling data of the second row (the i+1 row also) of the image data array of FIG. 1.

As shown in FIG. 5, for computing the correlative interpolation of the second row (the i+1 row also) of the image data array of FIG. 1, the signal stream 104, the signal stream 106, the signal stream 108, the signal stream 110 and the signal stream 112 are required at least. To computing the R interpolation ($\hat{R}_{23}$) and the B interpolation ($\hat{B}_{23}$) of $G_{23}$ of the second row of the image data array of FIG. 1, $G_{23}$ sampling data of the sampling data 130 of the second row of the image data array of FIG. 1 is selected according to the equation (14) and the equation (15). Then the mean value of $G_{23}$ ($LM(G_{23})$) is also selected by controlling the multiplexer 114. The $G_{23}$ sampling data is divided by $LM(G_{23})$ through the divider 116 and the result after division is sent to the register 118 and then to the multiplicator 120 and the multiplicator 122. Meanwhile, $AR_1$ from the signal stream 104 is sent to the multiplicator 120 through the register 128 by controlling the multiplexer 124 for multiplying the result of division and the R interpolation ($\hat{R}_{23}$) of $G_{23}$ is outputted from the output terminal 100; $AB_4$ from the signal stream 106 is sent to the multiplicator 122 by controlling the multiplexer 126 for multiplying the result of division, and then the B interpolation ($\hat{B}_{23}$) of $G_{23}$ is outputted from the output terminal 102.

As shown in the equation (4), the equation (5) and the equation (6), to compute the R interpolation ($\hat{R}_{24}$) and the G final interpolation ($\hat{G}_{24}^{(2)}$) of $B_{24}$ of the second row of the image data array of FIG. 1, $B_{24}$ sampling data is selected from the second row and the local mean of $B_{24}$ ($LM(B_{24})$) is outputted from the signal stream 110 by controlling the multiplexer 114. Then, $B_{24}$ sampling data is divided by $LM(B_{24})$ through the divider 116 and the result of division is sent to the multiplicator 120 and the multiplicator 122 through the register 118. Afterwards, the R local mean ($LM(R_{24})$) of $B_{24}$ in the signal stream 112 is sent to the multiplicator 120 through the register 128 by controlling the multiplexer 124, and is multiplied by the result of division, and the R interpolation ($\hat{R}_{24}$) of $B_{24}$ is outputted from the output terminal 100; the G initial interpolation ($\hat{G}_{24}^{(1)}$) of $B_{24}$ in the signal stream 108 is sent to the multiplicator 122 by controlling the multiplexer 126, and is multiplied by the result of division, and the G final interpolation ($\hat{G}_{24}^{(2)}$) of $B_{24}$ is outputted from the output terminal 102. The descriptions about generating every signal stream of FIG. 5 are as follows.

Figure 6:
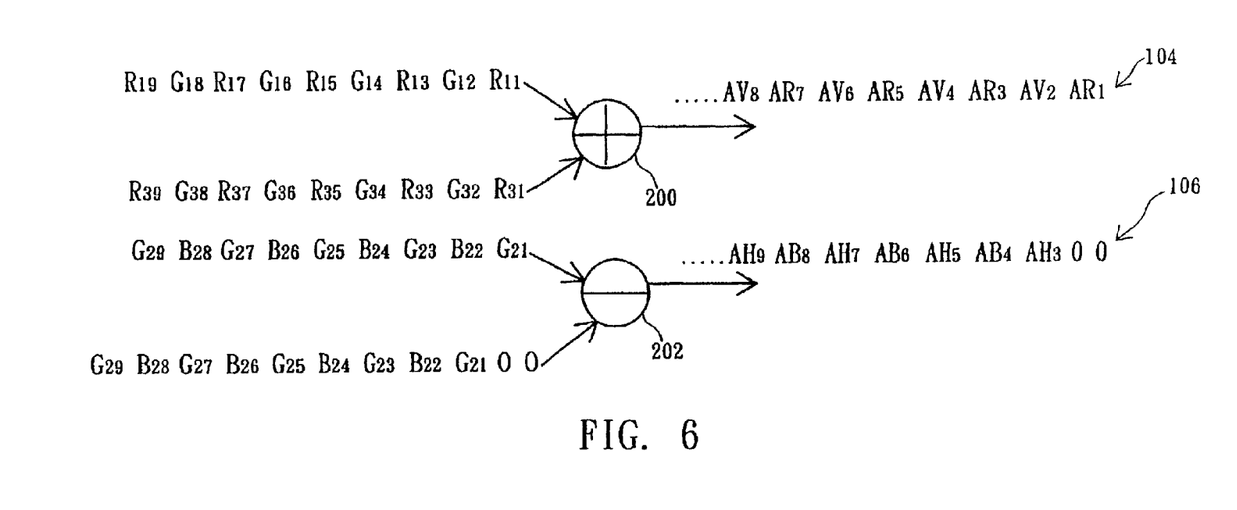
FIG. 6 is a computational flow sheet for common parameters shown in FIG. 4, wherein the image data array of FIG. 1 is utilized.

Referring to FIG. 6, which shows a computational flow sheet for common parameters shown in FIG. 4, wherein the image data array of FIG. 1 is utilized. The sampling data of the first row (i.e. the i row) and the sampling data of the third row (i.e. the i+2 row) of the image data array of FIG. 1, are sequentially inputted from $R_{11}$ and $R_{31}$ to the adder 200 correspondingly for addition as shown in FIG. 6. After the result of addition is shifted two bits rightward, $AR_1$, $AV_2$, $AR_3$, $AV_4$ and other common parameters are outputted correspondingly as shown in FIG. 6. Therefore, the signal stream 104 of FIG. 5 is constructed from the common parameters that are the output of the adder 200. Thus, to derive from the addition above, the red common parameter is $AR_x=(R_{1x}+R_{3x})/2$ and the vertical average is $AV_x=(G_{1x}+G_{3x})/2$, wherein the x is an integer not smaller than 1.

At the same time, the sampling data of the second row (i.e. the i+1 row) and the sampling data delayed by two system clocks from the second row (i.e. the i+1 row) of the image data array of FIG. 1 are sequentially inputted from the $G_{21}$ to the adder 202 correspondingly for addition as shown in FIG. 6. After the result of addition is shifted two bits rightward, O, O, $AH_3$, $AB_4$ and other common parameters are outputted in order as shown in FIG. 6, wherein the "O" indicates nothing because there is no result of addition generated in the beginning of addition at the first system clock and the second system clock. The signal stream 106 of FIG. 5 is constructed from the common parameters that are the output of the adder 202. Thus, to derive from the addition above, the blue common parameter is $AB_x=(B_{2x}+B_{2(x-2)})/2$ and the horizontal average for G component is $AH_x=(G_{2x}+G_{2(x-2)})/2$, wherein the x is an integer not smaller than 1.

Figure 7:
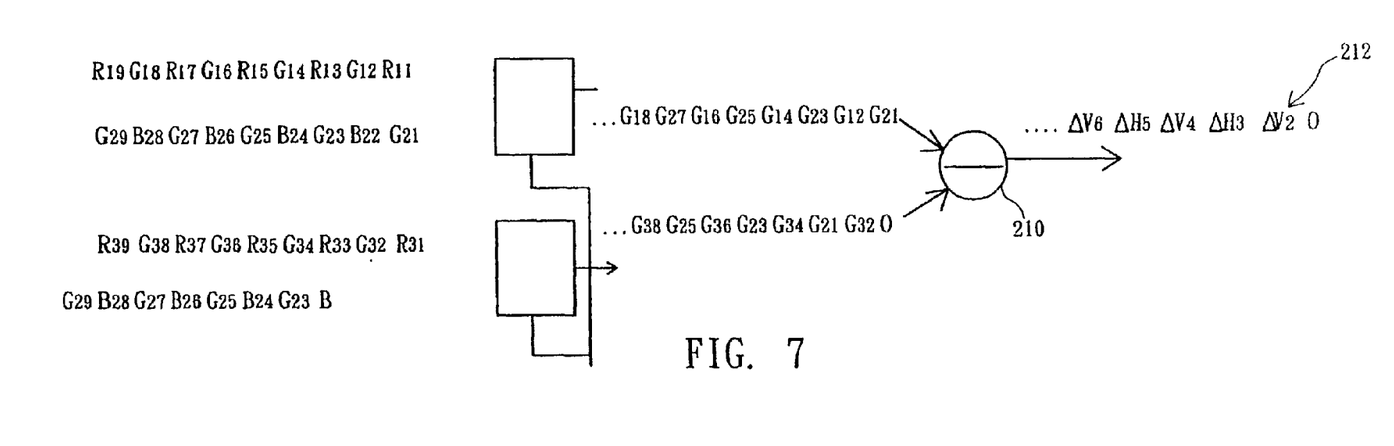
FIG. 7 is a computational flow sheet for the differentials of horizontal/vertical edges according to FIG. 4, wherein the image data array of FIG. 1 is utilized.

Referring to FIG. 7, which shows a computational flow sheet for the differentials of horizontal/vertical edges according to FIG. 4, wherein the image data array of FIG. 1 is utilized. By utilizing the system clock 208 to control the multiplexer 204, the G sampling data are sieved from the sampling data of the first row (i.e. the i row) and the second row (i.e. the i+1 row) of the image data array of FIG. 1 as shown in FIG. 7, and sent to the subtracter 210 from $G_{21}$ in order.

Meanwhile, by utilizing the system clock 208 to control the multiplexer 206, the G sampling data are sieved from the sampling data of the third row (i.e. the i+2 row) and the second row (i.e. the i+1 row) of the image data array of FIG. 1 as shown in FIG. 7, and sent to the subtracter 210 from O in order, wherein the sampling data of the second row is delayed by two system clocks to input to the multiplexer 206 than the sampling data of the third row, and the "O" indicates nothing, because of no sieved result generated from the multiplexer 206 in the beginning of the first system clock and the second system clock, for the sampling data of the second row is delayed two system clocks to input to the multiplexer 206 than the sampling data of the third row. In all diagrams of a preferred embodiment of the present invention, the "O" indicates no signal or nothing corresponding to the time, or the "O" indicates the signal that is not utilized in a preferred embodiment of the present invention.

The sieved result of the multiplexer 204 and that of the multiplexer 206 are inputted to the subtracter 210 for subtraction operation. After the result of subtraction, wherein O, $\Delta V_2$, $\Delta H_3$, $\Delta V_4$, $\Delta H_5$ and other horizontal and vertical differentials are outputted in order to construct the horizontal and vertical differentials signal stream 212, wherein the "O" is the output of subtracter 210 at the first clock. The $\Delta V_2$, $\Delta V_4$ and other vertical differentials in the horizontal and vertical differentials signal stream 212 are based on the equation (15)

$$\Delta V_x=|G_{1x}-G_{3x}| \qquad (15)$$

The $\Delta H_3$, $\Delta H_5$ and other horizontal differentials in the horizontal and vertical differentials signal stream 212 are based on the equation (16).

$$\Delta H_x = |G_{2x} - G_{2(x-2)}| \quad (16)$$

Figure 8:
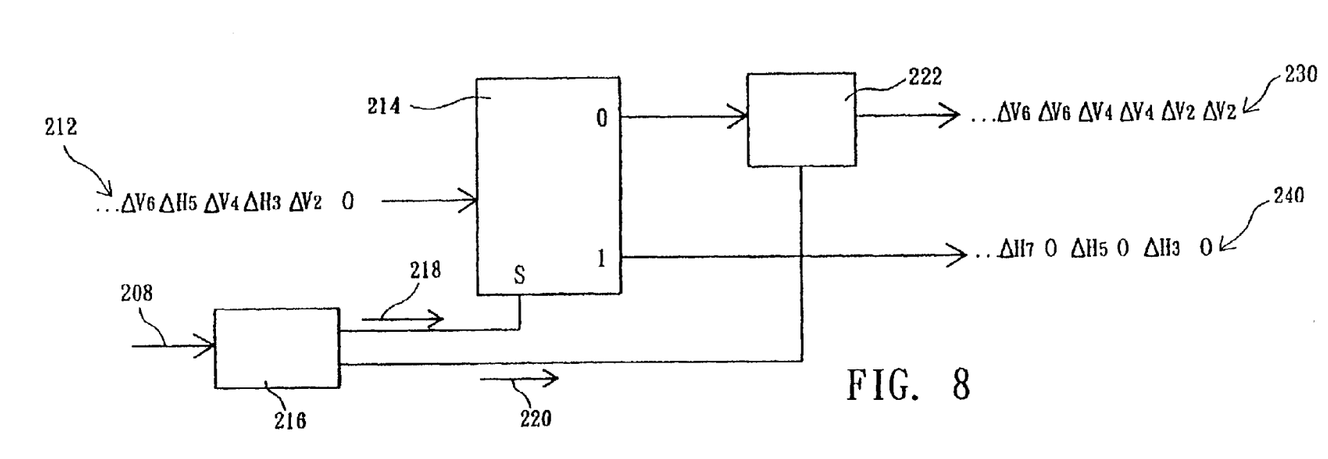
FIG. 8 is a diagram of separation performance of the horizontal and vertical differentials signal stream of a preferred embodiment of the present invention according to FIG. 7.

Referring to FIG. 8, which shows a diagram of separation performance of the horizontal and vertical differentials signal stream of a preferred embodiment of the present invention according to FIG. 7. In order to separate the horizontal and the vertical differentials from the horizontal and vertical differentials signal stream 212, the horizontal and vertical differentials signal stream 212 is sent to the multiplexer 214 of FIG. 8 from the subtracter 210 of FIG. 7.

Figure 9:
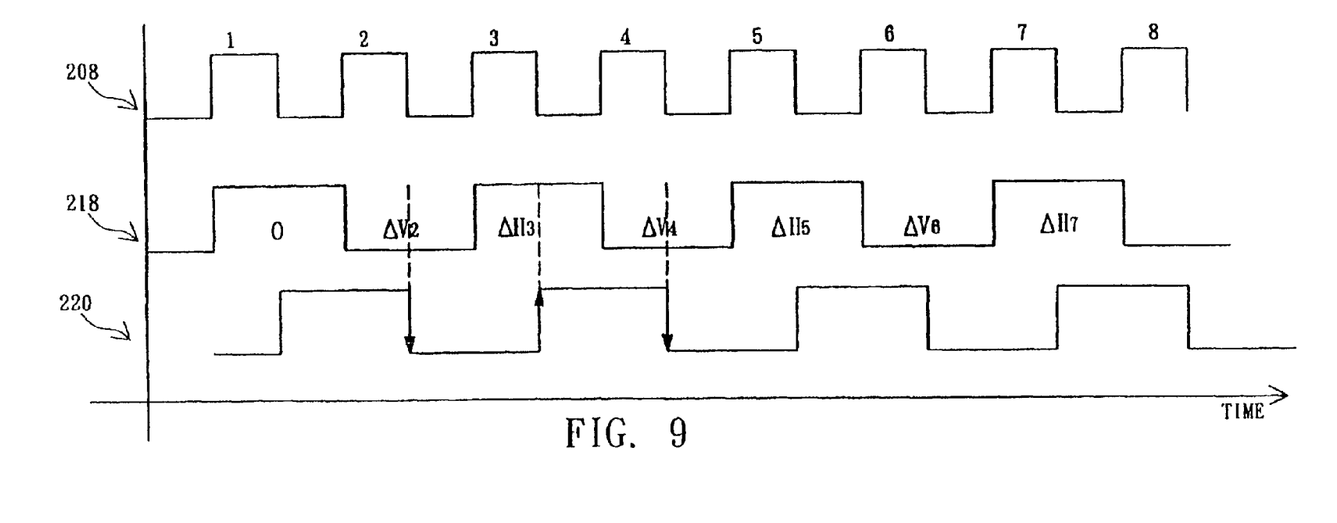
FIG. 9 is a diagram of system clock, first clock and second clock of a preferred embodiment of the present invention according to FIG. 8.

Referring to FIG. 9, which shows a diagram of the system clock, the first clock and the second clock of a preferred embodiment of the present invention according to FIG. 8. The system clock 208 of FIG. 9 is inputted to the frequency divider 216 of FIG. 8 for division operation. Then, the first clock 218 is sent to the multiplexer 214 of FIG. 8, and the second clock 220 is sent to the register 222 of FIG. 8, wherein the period of the first clock 218 and that of the second clock 220 are double as much as the period of the system clock 208.

Please referring the FIG. 8 and the FIG. 9, the horizontal differentials of the horizontal and vertical differential signal stream 212 are sent to the register 222 from the multiplexer 214 controlled by the first clock 218 of FIG. 9, when the first clock is at high level, and the vertical differentials of the horizontal and vertical differential signal stream 212 are sent to the register 222 from the multiplexer 214 controlled by the first clock 218 of FIG. 9, when the first clock is at low level. Therefore, the vertical differential signal stream 230 and the horizontal differential signal stream 240 of FIG. 8 are obtained in the same system clock, wherein the $\Delta H_3$ of the horizontal differential signal stream 240 corresponds to the $\Delta V_2$ of the vertical differential signal stream 230 in the first system clock, and the $\Delta H_5$ of the horizontal differential signal stream 240 corresponds to the $\Delta V_4$ of the vertical differential signal stream 230 in the second system clock, and so on.

Figure 10:
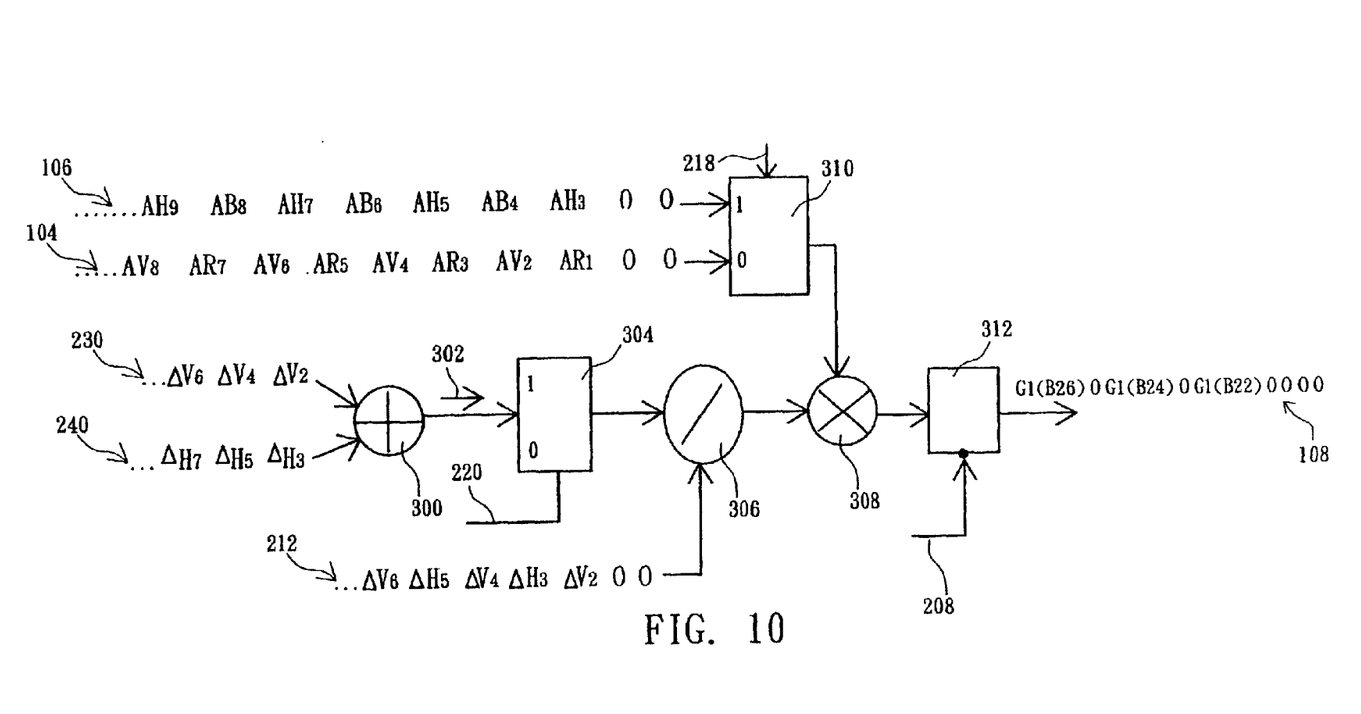
FIG. 10 is a computational flow sheet for the edge weighting of a preferred embodiment of the present invention.

Referring to FIG. 10, which shows a computational flow sheet for the edge weighting of a preferred embodiment of the present invention. The horizontal differentials signal stream 240 and the vertical differentials signal stream 230 from the multiplexer 214 of FIG. 8 are sent to the adder 300 of FIG. 10 so as to obtain the signal stream 302 constructed of the result of addition ($\Delta V_x + \Delta H_{(x+1)}$), for example: ($\Delta H_3 + \Delta V_2$), ($\Delta H_5 + \Delta V_4$), etc. Then, the signal stream 302 is sent to the register 304 controlled by the second clock 220 for zero-check. The zero-check is to check whether the $\Delta V_x$ and the $\Delta H_{(x+1)}$ of the signal stream 302 are zero or in accordance with the equation (4). If the $\Delta V_x$ and the $\Delta H_{(x+1)}$ of the signal stream 302 are zero, the computation would be stopped and the G initial interpolation would be computed and obtained according to the equation (4). If the $\Delta V_x$ and the $\Delta H_{(x+1)}$ of the signal stream 302 are not equal to zero, the signal stream 302 would be sent to the divider 306, and the corresponding signal of the horizontal and vertical differential signal stream 212 would be divided by the corresponding parameter of the signal stream 302. Thereafter, the result of division is sent to the multiplicator 308.

Meanwhile, the signal stream 106 and the signal stream 104 are sent to the multiplexer 310, and the horizontal average of the signal stream 106 is sent to the multiplicator 308 from the multiplexer 310 controlled by the first clock 218 when the first clock 218 is at high level, and is multiplied by the corresponding parameter outputted from the divider 306 according to the equation (4), and then the result of multiplication is sent to an accumulation addition unit 312; the vertical average of the signal stream 104 is sent to the multiplicator 308 from the multiplexer 310 controlled by the first clock 218 when the first clock 218 is at low level, and is multiplied by the corresponding parameter outputted from the divider 306 according to the equation (4), and then the result of multiplication is sent to an accumulation addition unit 312 so as to add to the prior result of multiplication registered in the accumulation addition unit 312. Afterwards, the signal stream 108 constructed of the G initial interpolation in FIG. 5 is outputted by the control of the system clock 208.

Figure 11:
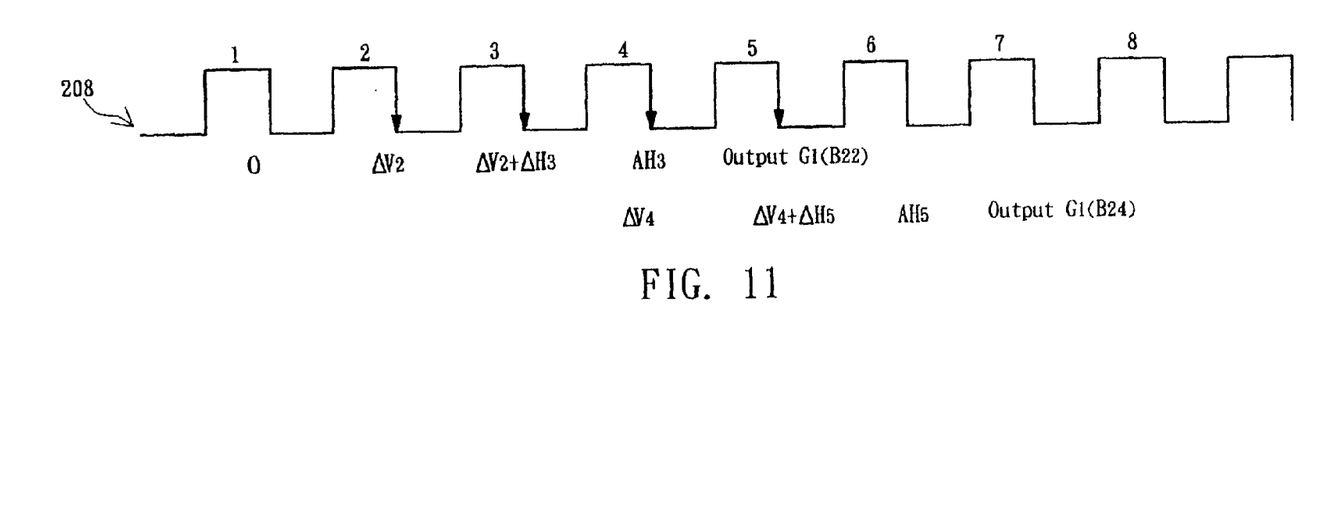
FIG. 11 is a diagram of system clock corresponding to the edge weighting of FIG. 10.

Referring to FIG. 11, which shows a diagram of system clock corresponding to the weighting computation of FIG. 8. Since no signal for handling appears in the first system clock, so that "O" is used as an indication. Then $\Delta H_3$ and $\Delta V_2$ are sent to the adder in the second system clock. In the third system clock, the result of addition of $\Delta H_3$ and $\Delta V_2$ is obtained, and then $\Delta V_2/(\Delta H_3 + \Delta V_2)$ is computed, wherein $\Delta V_2$ of the horizontal and vertical differential signal stream 212 is divided by ($\Delta H_3 + \Delta V_2$) sent to the divider 306, and then $\Delta H_3/(\Delta H_3 + \Delta V_2)$ is computed, wherein $\Delta H_3$ of the horizontal and vertical differentials signal stream 212 is divided by ($\Delta H_3 + \Delta V_2$) from the control of the second clock 220.

In the forth system clock, $\Delta V_2/(\Delta H_3 + \Delta V_2)$ is multiplied by $\Delta H_3$ of the signal stream 106 that is sent to the multiplicator 308 from the multiplexer 310 controlled by the first clock 218, and the result of multiplication is sent to the accumulation addition unit 312. Then $\Delta H_3/(\Delta H_3 + \Delta V_2)$ is multiplied by $\Delta V_2$ of the signal stream 104 that is sent to the multiplicator 308 from the multiplexer 310 controlled by the first clock 218, and the result of multiplication is sent to the accumulation addition unit 312 to add to the prior parameter. Meanwhile, $\Delta H_5$ and $\Delta V_4$ are sent to the adder. Then the G initial interpolation ($\hat{G}_{22}^{(1)}$) of $B_{22}$ is outputted by the control of the system clock 208 in the fifth system clock. At the same time, the performance step of $\Delta H_5$ and $\Delta V_4$ is similar to the performance step of $\Delta H_3$ and $\Delta V_2$ at the third system clock, so that the signal stream 108 constructed of different G initial interpolation outputted from the accumulation addition unit 312 is obtained.

Figure 12:
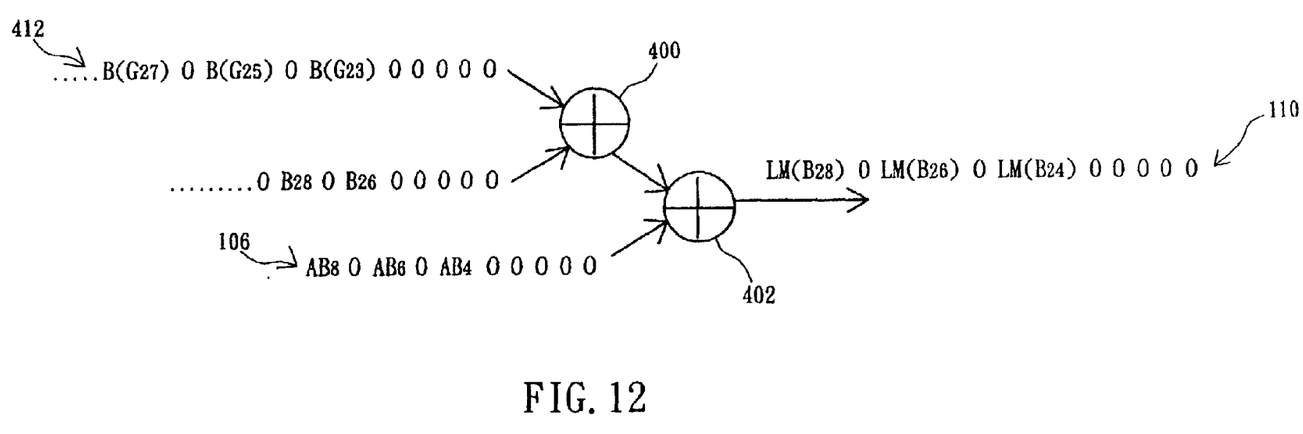
FIG. 12 is a flow sheet of the B local mean computation according to the mean computations of FIG. 4.

Referring to FIG. 12, which shows a flow sheet of the B local mean computation of FIG. 4. In order to obtain the signal stream 110 constructed of B local mean value, the B sampling data are first sieved from the second row of the image data array of FIG. 1, and the B interpolation is sieved from the signal stream 412 that is outputted from the output terminal 102 of FIG. 5. As shown in FIG. 12, the B interpolation of $G_{23}$ and the $B_{26}$ sampling data are sent to the adder 400 for addition operation. The result of addition and $AB_4$ of the signal stream 106 are added together and shifted two bits rightward to obtain the signal stream 110 constructed of the B local mean value in FIG. 5, wherein $AB_4$ is derived from $AB_x = (B_{2x} + B_{2(x-2)})/2$.

Figure 13:
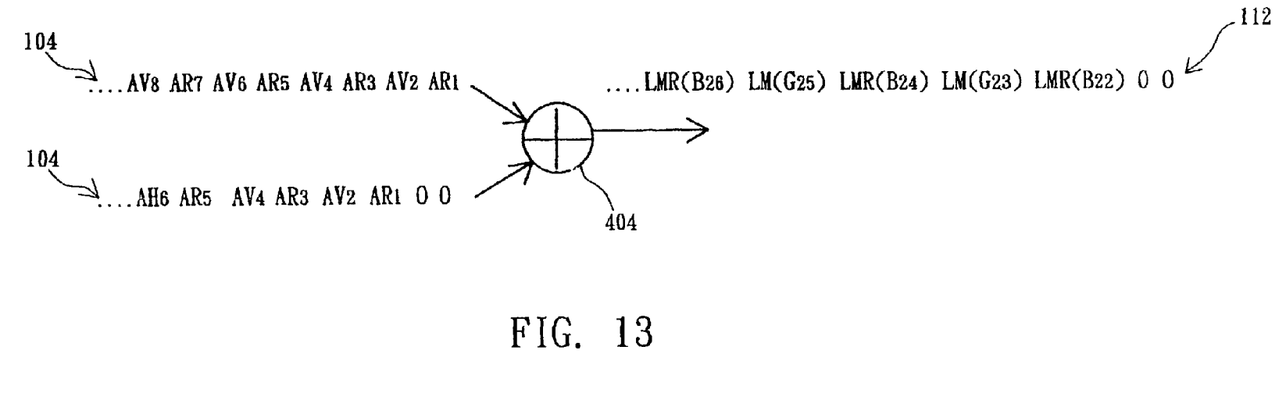
FIG. 13 is a computational flow sheet for the R edge mean value and the G mean value according to the mean computations of FIG. 4.

Referring to FIG. 13, which shows a computational flow sheet of the R edge mean value and the G mean value of FIG. 4. In order to obtain the signal stream 112 constructed of the R edge mean value and the G mean value in FIG. 5, the signal stream 104 is outputted from the adder 200 in FIG. 6, and the signal stream 104 that is delayed by two system clocks is sent to the adder 404 for addition operation. Therefore, the signal stream 112 constructed of the R edge mean value and the G mean value can be obtained.

After the signal stream 104, the signal stream 106, the signal stream 108, the signal stream 110 and the signal stream 112 are obtained from the computations described above, the interpolations corresponding to every sampling data of the image data array of FIG. 1 are obtained in order. Then the selection for interpolated components 60 is performed for selecting the appropriate output signal, and the parallel process 62 is performed with the appropriate output signal and the result of computations for common parameters, and the corresponding interpolation is outputted from the output 64 finally.

The advantage of the present invention is to provide a high-performance color interpolation processor and the color interpolation calculation method thereof. By utilizing the color interpolation calculation method of the present invention in the image signal process system using CCD for sampling, the better interpolation quality is provided, and the time of computing interpolation is decreased at the same time, so that the efficiency of interpolation process is enhanced. Thus, the present invention is suitable for use in real-time image process system, thereby decreasing the cost.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A color interpolation calculation method, is utilized in a image process system, comprising:

providing a image data array, wherein the image data array constructed of a plurality of image sampling data combination is with M rows and N columns and the plurality of image sampling data combination is constructed of a first data row and a second data row wherein the first data row is constructed of a plurality of first sampling data and a plurality of second sampling data spaced in-between, and the second row is constructed of a plurality of third sampling data and a plurality of forth sampling data spaced in-between, and the plurality of second sampling data are a first-color if the plurality of first sampling data are a third-color, and the plurality of forth sampling data are a second-color if the plurality of third sampling data are the first-color;

performing a first interpolation process onto a third sampling data of the plurality of third sampling data of a N−2 column of the second data row of a first image sampling data combination of the plurality of image sampling data combination, wherein the first interpolation process comprising:

performing a first first-color mean value computation to obtain a first first-color mean value of the third sampling data;

performing a first second-color interpolation computation to obtain a first second-color interpolation of the third sampling data; and performing a first third-color interpolation computation to obtain a first third-color interpolation of the third sampling data; and performing a second interpolation process onto a second sampling data of the plurality of second sampling data of a N−1 column of the first data row of a second image sampling data combination of the plurality of image sampling data combination, wherein the second interpolation process comprising:

performing a second first-color mean value computation to obtain a second first-color mean value of the second sampling data;

performing a second second-color interpolation computation to obtain a second second-color interpolation of the second sampling data; and performing a second third-color interpolation computation to obtain a second third-color interpolation data of the second sampling data; and performing a third interpolation process to a forth sampling data of the plurality of forth sampling data of a N−1 column of the second data row of a first image sampling data combination of the plurality of image sampling data combination, wherein the third interpolation process comprising:

performing a second-color mean value computation to obtain a second-color mean value of the forth sampling data;

performing a first first-color interpolation computation to obtain a first first-color final interpolation of the forth sampling data; and performing a third third-color interpolation computation to obtain a third third-color interpolation of the forth sampling data; and performing a forth interpolation process onto a first sampling data of the plurality of first sampling data of a N−2 column of the first data row of a second image sampling data combination of the plurality of image sampling data combination, wherein the forth interpolation process comprising:

performing a third-color mean value computation to obtain a third-color mean value of the first sampling data;

performing a second first-color interpolation computation to obtain a second first-color final interpolation of the first sampling data; and performing a third second-color interpolation computation to obtain a third second-color interpolation of the first sampling data.

2. The method of claim 1, wherein the first-color is green.

3. The method of claim 1, wherein the second-color is blue.

4. The method of claim 1, wherein the third-color is red.

5. The method of claim 1, wherein the M is a first integer that is not smaller than 3.

6. The method of claim 1, wherein the N is a second integer that is not smaller than 6.

7. The method of claim 1, wherein the first first-color mean value computation is to add the second sampling data of the plurality of second sampling data of the N−3 column of the first data row of the first image sampling data combination, the second sampling data of the plurality of second sampling data of the N−1 column of the first data row of the first image sampling data combination, the second sampling data of the plurality of second sampling data of the N−3 column of the first data row of the second image sampling data combination and the second sampling data of the plurality of second sampling data of the N−1 column of the first data row of the second image sampling data combination to obtain a result of addition, and then to perform an average computation with the result of addition to obtain the first first-color mean value.

8. The method of claim 1, wherein the second first-color mean value computation is to add the third sampling data of the plurality of third sampling data of the N−2 column of the second data row of the first image sampling data combination, the third sampling data of the plurality of third sampling data of the N column of the second data row of the first image sampling data combination, the third sampling data of the plurality of third sampling data of the N−2 column of the second data row of the second image sampling data combination and the third sampling data of the plurality of third sampling data of the N column of the second data row of the second image sampling data combination to obtain a result of addition, and then to perform an average computation with the result of addition to obtain the second first-color mean value.

9. The method of claim 1, wherein the second-color mean value computation is to add the forth sampling data of the plurality of forth sampling data of the N−3 column of the second data row of the first image sampling data combination, the forth sampling data of the plurality of forth sampling data of the N−1 column of the second data row of the first image sampling data combination, the forth sampling data of the plurality of forth sampling data of the N+1 column of the second data row of the first image sampling data combination and the first second-color interpolation of the third sampling data of the plurality of third sampling data of the N−2 column of the second data row of the first image sampling data combination to obtain a result of addition, and then to perform an average computation with the result of addition to obtain the second-color mean value.

10. The method of claim 1, wherein the third-color mean value computation is to add the first sampling data of the plurality of first sampling data of the N−4 column of the first data row of the second image sampling data combination, the first sampling data of the plurality of first sampling data of the N−2 column of the first data row of the second image sampling data combination, the first sampling data of the plurality of first sampling data of the N column of the first data row of the second image sampling data combination and the second third-color interpolation of the second sampling data of the plurality of second sampling data of the N−3 column of the first data row of the second image sampling data combination to obtain a result of addition, and then to perform an average computation with the result of addition to obtain the third-color mean value.

11. The method of claim 1, wherein the first second-color interpolation computation is to perform a average computation with the forth sampling data of the plurality of forth sampling data of the N−3 column of the second data row of the first image sampling data combination and the forth sampling data of the plurality of forth sampling data of the N−1 column of the second data row of the first image sampling data combination to obtain a first average value, and then the result of the first average value multiplied by the third sampling data of the plurality of third sampling data of the N−2 column of the second data row of the first image sampling data combination, is divided by the first first-color mean value to obtain the first second-color interpolation.

12. The method of claim 1, wherein the first third-color interpolation computation is to perform a average computation with the first sampling data of the plurality of first sampling data of the N−2 column of the first data row of the first image sampling data combination and the first sampling data of the plurality of first sampling data of the N−2 column of the first data row of the second image sampling data combination to obtain a second average value, and then the result of the second average value multiplied by the third sampling data of the plurality of third sampling data of the N−2 column of the second data row of the first image sampling data combination is divided by the first first-color mean value to obtain the first third-color interpolation.

13. The method of claim 1, wherein the second third-color interpolation computation is to perform a average computation with the first sampling data of the plurality of first sampling data of the N−2 column of the first data row of the second image sampling data combination and the first sampling data of the plurality of first sampling data of the N column of the first data row of the second image sampling data combination to obtain a third average value, and then the result of the third average value multiplied by the second sampling data of the plurality of second sampling data of the N−1 column of the first data row of the second image sampling data combination is divided by the second first-color mean value to obtain the second third-color interpolation.

14. The method of claim 1, wherein the second second-color interpolation computation is to perform an average computation with the forth sampling data of the plurality of forth sampling data of the N−1 column of the second data row of the first image sampling data combination and the forth sampling data of the plurality of forth sampling data of the N−1 column of the second data row of the second image sampling data combination to obtain a forth average value, and then the result of the forth average value multiplied by the second sampling data of the plurality of second sampling data of the N−1 column of the first data row of the second image sampling data combination is divided by the second first-color mean value to obtain the second second-color interpolation.

15. The method of claim 1, wherein the first first-color interpolation computation comprising:
 performing a first differential computation to obtain a first horizontal differential and a first vertical differential;
 performing a first average computation to obtain a first horizontal average and a first vertical average;
 performing a first first-color initial interpolation computation to obtain a first first-color initial interpolation; and
 obtaining the first first-color final interpolation that is a result of the first first-color initial interpolation multiplied by the forth sampling data of the plurality of forth sampling data of the N−1 column of the second data row of the first image sampling data combination and divided by the second-color mean value.

16. The method of claim 15, wherein the first differential computation comprising:
 obtaining the first horizontal differential that is an absolute value of the third sampling data of the plurality of third sampling data of the N column of the second data row of the first image sampling data combination minus the third sampling data of the plurality of third sampling data of the N−2 column of the second row of the first image sampling data combination; and
 obtaining the first vertical differential that is an absolute value of subtraction of the second sampling data of the plurality of second sampling data of the N−1 column of the first data row of the second image sampling data combination minus the second sampling data of the plurality of second sampling data of the N−1 column of the first data row of the first image sampling data combination.

17. The method of claim 15, wherein the first average computation comprising:
 obtaining the first horizontal average that is a result of an average of the third sampling data of the plurality of third sampling data of the N−2 column of the second data row of the first image sampling data combination and the third sampling data of the plurality of third sampling data of the N column of the second data row of the first image sampling data combination; and
 obtaining the first vertical average that is a result of an average of the second sampling data of the plurality of second sampling data of the N−1 column of the first data row of the first image sampling data combination and the second sampling data of the plurality of second sampling data of the N−1 column of the first data row of the second image sampling data combination.

18. The method of claim 15, wherein the first first-color initial interpolation computation comprising:
obtaining a first value that is a result of the first horizontal average multiplied by the first vertical differential and divided by a result of an addition of the first vertical differential and the first horizontal differential;
obtaining a second value that is a result of the first vertical average multiplied by the first horizontal differential and divided by a result of an addition of the first vertical differential and the first horizontal differential; and
obtaining the first first-color initial interpolation that is a result of an addition of the first value and the second value.

19. The method of claim 1, wherein the second first-color interpolation computation comprising:
performing a second differential computation to obtain a second horizontal differential and a second vertical differential;
performing a second average computation to obtain a second horizontal average and a second vertical average;
performing a second first-color initial interpolation computation to obtain a second first-color initial interpolation; and
obtaining the second first-color final interpolation that is a result of the second first-color initial interpolation multiplied by the first sampling data of the plurality of first sampling data of the N−2 column of the first data row of the second image sampling data combination and divided by the third-color mean value.

20. The method of claim 19, wherein the second differential computation comprising:
obtaining the second horizontal differential that is an absolute value of the second sampling data of the plurality of second sampling data of the N−1 column of the first row of the second image sampling data combination minus the second sampling data of the plurality of second sampling data of the N−3 column of the first row of the second image sampling data combination; and
obtaining the second vertical differential that is a absolute value of the third sampling data of the plurality of third sampling data of the N−2 column of the second row of the second image sampling data combination minus the third sampling data of the plurality of third sampling data of the N−2 column of the second row of the first image sampling data combination.

21. The method of claim 19, wherein the second average computation comprising:
obtaining the second horizontal average that is a result of an average of the second sampling data of the plurality of second sampling data of the N−3 column of the first data row of the second image sampling data combination and the second sampling data of the plurality of second sampling data of the N−1 column of the first data row of the second image sampling data combination; and
obtaining the second vertical average that is a result of an average of the third sampling data of the plurality of third sampling data of the N−2 column of the second data row of the first image sampling data combination and the third sampling data of the plurality of third sampling data of the N−2 column of the second data row of the second image sampling data combination.

22. The method of claim 19, wherein the first first-color initial interpolation computation comprising:
obtaining a third value that is a result of the second horizontal average multiplied by the second vertical differential and divided by a result of an addition of the second vertical differential and the second horizontal differential;
obtaining a forth value that is a result of the second vertical average multiplied by the second horizontal differential and divided by a result of an addition of the second vertical differential and the second horizontal differential; and
obtaining the second first-color initial interpolation that is a result of an addition of the third value and the forth value.

23. The method of claim 1, wherein the third third-color interpolation computation comprising:
obtaining a third-color edge average that is an average of the first sampling data of the plurality of first sampling data of the N−2 column of the first row of the first image sampling data combination, the first sampling data of the plurality of first sampling data of the N column of the first row of the first image sampling data combination, the first sampling data of the plurality of first sampling data of the N−2 column of the first row of the second image sampling data combination and the first sampling data of the plurality of first sampling data of the N column of the first row of the second image sampling data combination; and
obtaining the third third-color interpolation that is a result of the third-color edge average multiplied by the forth sampling data of the plurality of forth sampling data of the N−1 column of the second row of the first image sampling data combination and divided by the second-color average.

24. The method of claim 1, wherein the third second-color interpolation computation comprising:
obtaining a second-color edge average that is an average of the forth sampling data of the plurality of forth sampling data of N−3 column of the second row of the first image sampling data combination, the forth sampling data of the plurality of forth sampling data of N−1 column of the second row of the first image sampling data combination, the forth sampling data of the plurality of forth sampling data of N−3 column of the second row of the second image sampling data combination and the forth sampling data of the plurality of forth sampling data of N−1 column of the second row of the second image sampling data combination; and
obtaining the third second-color interpolation that is a result of the second-color edge average multiplied by the first sampling data of the plurality of first sampling data of the N−2 column of the first row of the second image sampling data combination and divided by the third-color average.

25. A color interpolation processor, which is used in a image process system that consists of a first buffer and a second buffer for receiving a plurality of data rows of a image data array from outside, comprising:
a computation module of common parameters, that is used to receive a first data row, a second data row and a third data row of the plurality of data rows of the image data array, and to perform a computation of common parameters for a plurality of common parameters;

a computation module of horizontal differential and vertical differential, that is used to receive the first data row, the second data row and the third data row of the plurality of data rows of the image data array, and to perform a computation of horizontal differential and vertical differential for a plurality of horizontal differentials and a plurality of vertical differentials;

a computation module of average, that is used to receive the plurality of common parameters from the computation module of common parameters, and to perform an average computation for a plurality of edge averages and a plurality of local means;

a computation module of edge weighting, that is used to receive the plurality of common parameters from the computation module of common parameters, the plurality of horizontal differentials and the plurality of vertical differentials from the computation module of horizontal differential and vertical differential for computing of a plurality of final interpolations; and a selective module of interpolation, that is used to receive the plurality of final interpolations of the computation module of edge weighting, the plurality of edge averages and the plurality of local means from the computation module of average, and to perform a computation to output a plurality of interpolations, and the plurality of final interpolations corresponding to the first data row, the second data row and the third data row.

26. A color interpolation processor of claim 25, wherein further comprising a parallel process module, that is used to perform a parallel output for the plurality of interpolations and the plurality of final interpolations of the selective module of interpolation.

27. A color interpolation processor of claim 25, wherein the plurality of common parameters comprising a plurality of horizontal averages, a plurality of vertical averages, a plurality of red common parameters and a plurality of blue common parameters.

* * * * *